United States Patent
Lugg (10) Patent No.: US 8,369,601 B2
(45) Date of Patent: Feb. 5, 2013

(54) METHOD OF PROCESSING A CHECK IN AN IMAGE-BASED CHECK PROCESSING SYSTEM AND AN APPARATUS THEREFOR

(75) Inventor: Richard P. Lugg, Waterloo (CA)

(73) Assignee: NCR Corporation, Duluth, GA (US)

(*) Notice: Subject to any disclaimer, the term of this patent is extended or adjusted under 35 U.S.C. 154(b) by 2230 days.

(21) Appl. No.: 10/315,852

(22) Filed: Dec. 10, 2002

(65) Prior Publication Data

US 2004/0109597 A1 Jun. 10, 2004

(51) Int. Cl.
*G06K 9/00* (2006.01)
(52) U.S. Cl. .................................. 382/137
(58) Field of Classification Search ........... 382/137–140
See application file for complete search history.

(56) References Cited

U.S. PATENT DOCUMENTS

| | | | |
|---|---|---|---|
| 5,040,227 A * | 8/1991 | Lyke et al. ............ | 382/138 |
| 5,373,550 A | 12/1994 | Campbell et al. | |
| 5,444,794 A | 8/1995 | Uhland, Sr. | |
| 5,544,043 A | 8/1996 | Miki et al. | |
| 5,691,524 A | 11/1997 | Josephson | |
| 5,870,725 A | 2/1999 | Bellinger et al. | |
| 5,890,141 A | 3/1999 | Carney et al. | |
| 5,895,455 A | 4/1999 | Bellinger et al. | |
| 5,930,778 A | 7/1999 | Geer | |
| 6,032,137 A | 2/2000 | Ballard | |
| 6,097,834 A | 8/2000 | Krouse et al. | |
| 6,126,203 A | 10/2000 | Dwork et al. | |
| 6,129,273 A | 10/2000 | Shah | |
| 6,181,814 B1 | 1/2001 | Carney | |
| 6,282,308 B1 * | 8/2001 | Cossette ................ | 382/137 |
| 6,721,783 B1 * | 4/2004 | Blossman et al. ........ | 709/206 |
| 2002/0145035 A1 | 10/2002 | Jones | |
| 2002/0152164 A1 | 10/2002 | Dutta et al. | |
| 2002/0184151 A1 | 12/2002 | Maloney | |

FOREIGN PATENT DOCUMENTS

WO  WO 01/84417 A1  11/2001

* cited by examiner

*Primary Examiner* — Tom Y Lu
(74) *Attorney, Agent, or Firm* — Michael Chan (57) ABSTRACT

Check image data which is representative of an image of the check is captured. Endorsement data which is representative of an image of an endorsement is appended to the check image data to provide endorsed check image data which is representative of an image of the check and the endorsement. The endorsed check image data is stored in memory.

6 Claims, 6 Drawing Sheets

James C. Morrison
1998 Main Street
Palm Shore, CA 94030

3049

Pay to the Order of  John Doe                    July 1   19 98

$ 28.00

Twenty—Eight                                      DOLLARS

James C. Morrison memo _______

0246 abcdef 13579

James C. Morrison
1998 Main Street
Palm Shore, CA 94030

3049

*July 1,* 19 *98*

Pay to the
Order of *John Doe* $ 28.00

*Twenty-Eight* DOLLARS memo ______________  *James C. Morrison*

⑆123456789⑆ 258147 0000 3049 ⑈ 00000 2800 ⑈

54

METHOD OF PROCESSING A CHECK IN AN IMAGE-BASED CHECK PROCESSING SYSTEM AND AN APPARATUS THEREFOR

BACKGROUND OF THE INVENTION

The present invention relates to image-based check processing systems, and is particularly directed to a method of processing a check in an image-based check processing system and an apparatus therefor.

A typical image-based check processing system includes a check processing transport which has a document track and a number of check processing modules positioned along the document track for performing specific document processing operations on document items including checks moving downstream along the document track. Each check processing module includes a number of hardware devices contained within the check processing module during operation of the check processing transport. The check processing system also includes a transport processor which executes a transport application program which is stored in memory to control operation of the hardware devices contained within the check processing modules positioned along the document track and thereby to control operation of the check processing transport.

More specifically, the check processing transport includes a hopper module into which a stack of document items are placed. A document feeder module adjacent the hopper module selectively feeds or drives each document item from the stack of document items in the hopper module to transport the document item past an imaging camera of an image capture module. The imaging camera captures an image of the document item and stores the captured image in memory. The document item moves downstream along the document track to sorting pockets of a pocket module located at the end of the document track. The pockets receive document items which have been sorted in accordance with the transport application program.

In some known check processing transport applications, each document item is also transported along the document track past a printer of an endorser module. The printer of the endorser module prints an endorsement onto each document item moving past the printer. A drawback in printing an endorsement onto each document item is that the endorsement is occasionally overprinted onto original text already on the document item. This may result in an endorsement which is difficult to read. Also, there is sometimes a requirement to capture an image of a check which has been endorsed. When there is such a requirement, the endorsed check is processed in another pass through the check processing transport to capture an image of the endorsed check. In this case, if the endorsement on the endorsed check should happen to be difficult to read, the endorsement from the image of the endorsed check would be even more difficult to read.

SUMMARY OF THE INVENTION

In accordance with one aspect of the present invention, an apparatus is provided for processing a check in an image-based check processing system. The apparatus comprises means for capturing check image data which is representative of an image of the check, means for appending supplemental data which is representative of an image of supplemental information to the check image data to provide supplemental check image data which is representative of an image of the check and the supplemental information, and means for storing the supplemental check image data.

The appending means may include means for appending the supplemental data to the check image data such that the supplemental information appears along the top edge of the check image when the check image is displayed on a display. Alternatively, the appending means includes means for appending the supplemental data to the check image data such that the supplemental information appears along the leading edge of the check image when the check image is displayed on a display.

In accordance with another aspect of the present invention, a method of processing a check in an image-based check processing system comprises the steps of (a) capturing check image data which is representative of an image of the check, (b) appending supplemental data which is representative of an image of supplemental information to the check image data to provide supplemental check image data which is representative of an image of the check and the supplemental information, and (c) storing the supplemental check image data of step (a).

Step (b) may include the step of (b-1) appending the supplemental data to the check image data such that the supplemental information appears along the top edge of the check image when the check image is displayed on a display. Alternatively, step (b) may include the step of (b-1) appending the supplemental data to the check image data such that the supplemental information appears along the leading edge of the check image when the check image is displayed on a display.

In accordance with yet another aspect of the present invention, an apparatus is provided for processing a check in an image-based check processing system. The apparatus comprises means for capturing check image data which is representative of an image of the check, means for appending endorsement data which is representative of an image of an endorsement to the check image data to provide endorsed check image data which is representative of an image of the check and the endorsement, and means for storing the endorsed check image data.

The appending means may include means for appending the endorsement data to the check image data such that the endorsement appears along the top edge of the check image when the check image is displayed on a display. Alternatively, the appending means may include means for appending the endorsement data to the check image data such that the endorsement appears along the leading edge of the check image when the check image is displayed on a display.

In accordance with still another aspect of the present invention, a method of processing a check in an image-based check processing system comprises the steps of (a) capturing check image data which is representative of an image of the check, (b) appending endorsement data which is representative of an image of an endorsement to the check image data to provide endorsed check image data which is representative of an image of the check and the endorsement, and (c) storing the endorsed check image data of step (a).

Step (b) may include the step of (b-1) appending the endorsement data to the check image data such that the endorsement appears along the top edge of the check image when the check image is displayed on a display. Alternatively, step (b) may include the step of (b-1) appending the endorsement data to the check image data such that the endorsement appears along the leading edge of the check image when the check image is displayed on a display.

In accordance with another aspect of the present invention, an image-based check processing system comprises means defining a check transport path along which a check can be transported, an imaging camera disposed along the check transport path, an image capture application program, an endorsement data generator application program, an endorsement manager application program, and control means for (i) controlling the image capture application program to capture check image data which is representative of an image of the check as the check is being transported past the imaging camera, (ii) controlling the endorsement data generator application program to generate endorsement data which is representative of an image of an endorsement for the check, and (iii) controlling the endorsement manager application program to append the endorsement data to the check image data to provide endorsed check image data which is representative of an image of the check having an endorsement appended thereto.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

The present invention is directed to a method of processing a document in an image-based check processing system and an apparatus therefor. The specific construction and use of the image-based check processing system may vary. The image-based check processing system 10 may be, for example, a sorting machine or a proof machine wherein documents such as bank checks are processed in a data processing operation.

Figure 1:
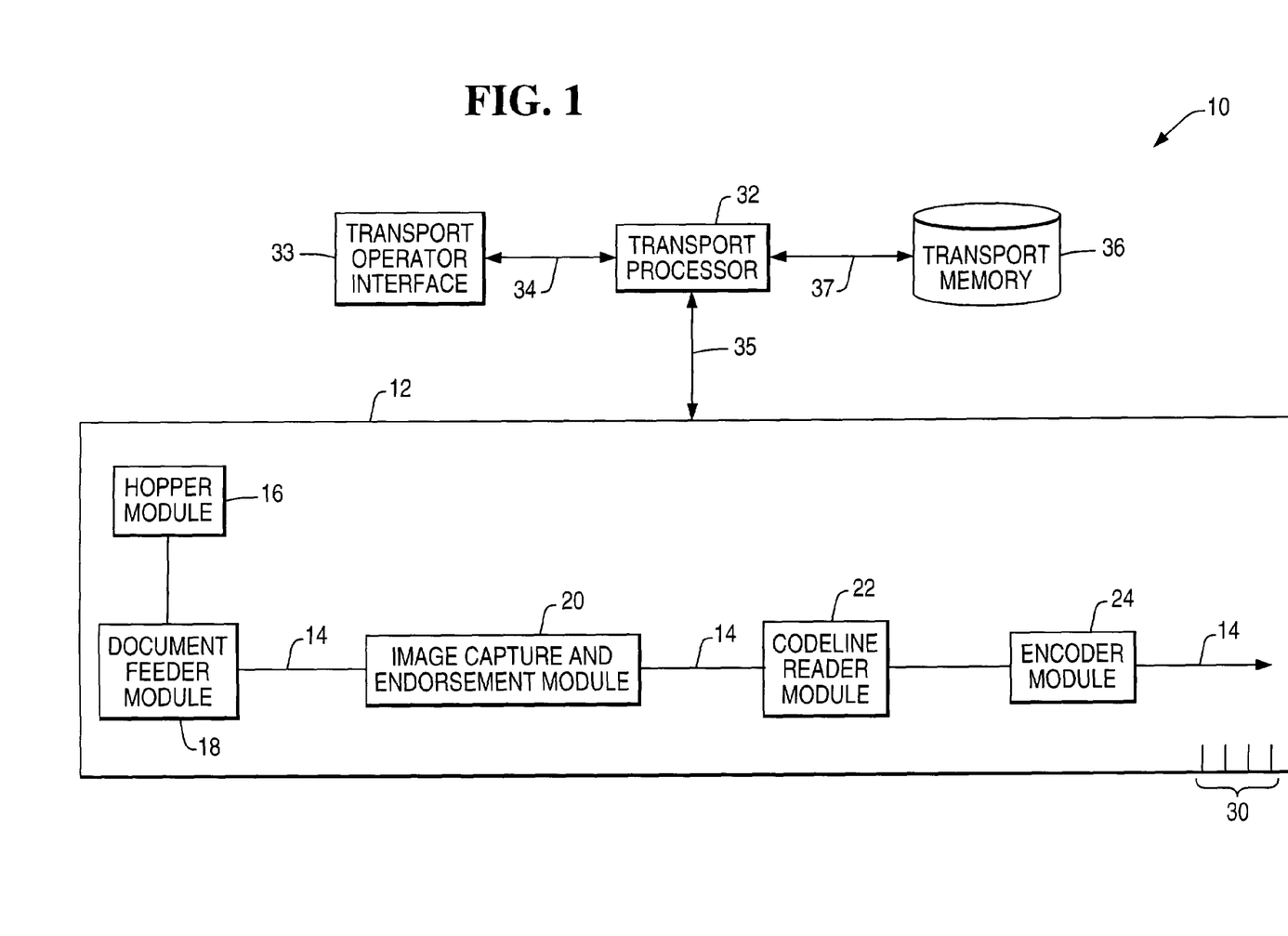
FIG. 1 is a schematic view of an image-based check processing system embodying the present invention.

As shown in FIG. 1, a check processing system 10 includes a check processing transport 12 having a document track 14 along which financial document items, such as checks, can be transported from an upstream end to a downstream end. The transport 12 includes a number of different check processing modules lying along the document track 14. Each check processing module includes a number of hardware devices associated with the particular check processing module for performing specific document processing operations on document items moving along the document track. The transport 12 includes a hopper module 16 into which a stack of financial document items including checks are placed. A document feeder module 18 adjacent the hopper module 16 selectively feeds or drives each document item from the stack of document items in the hopper module to transport the document item from the upstream end to the downstream end along the document track 14 to sorting pockets of a pocket module 30 located at the end of the document track.

Figure 2:
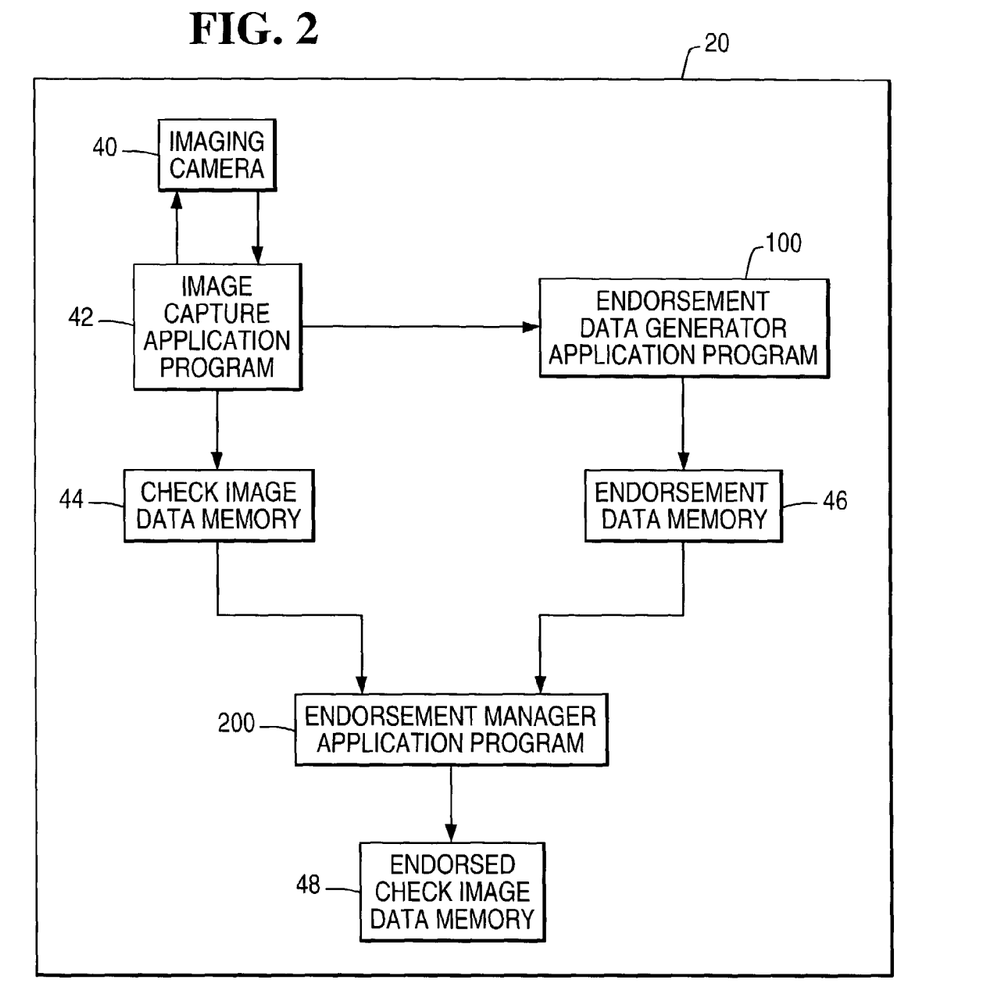
FIG. 2 is a schematic view of an image capture and endorsement module used in the image-based check processing system of FIG. 1.

Referring to FIGS. 1 and 2, the check processing system 10 includes an image capture and endorsement module 20 disposed along the document track 14. The image capture and endorsement module 20 captures an image of each document item for a number of different purposes well known in the financial industry. As shown in FIG. 2, the image capture and endorsement module 20 includes an imaging camera 40 which is located along the document track 14. The imaging camera 40 includes an optical system having a number of lenses (not shown) through which the image of a document item is focused. The imaging camera 40 may include a charge-coupled device (CCD) or other suitable element having a linear array of sensors which scan the image of the document item. A trigger sensor (also not shown) is located along the document track 14 upstream of the imaging camera 40. The trigger sensor provides a trigger signal when the leading edge of the document item moving along the document track 14 moves past the trigger sensor. Accordingly, the trigger sensor provides a trigger signal when the leading edge of the document item moving along the document track 14 is about to move in front of the imaging camera 40.

An image capture application program 42 controls the imaging camera 40 to capture an image of the document item as the document item moves in front of the camera towards the downstream end of the document track 14. More specifically, as the document item moves past the imaging camera 40, the camera generates check image data in the form of successive scan lines of pixels to produce a matrix of pixels associated with the document item. Each pixel is usually represented by gray scale image data in which a particular gray level is associated with the pixel. For example, each pixel may have any one of 256 gray levels associated therewith, ranging from completely black (level zero) to completely white (level 255). Alternatively, the imaging camera 40 may be of the type which captures color image data associated with the document item.

Figure 3:
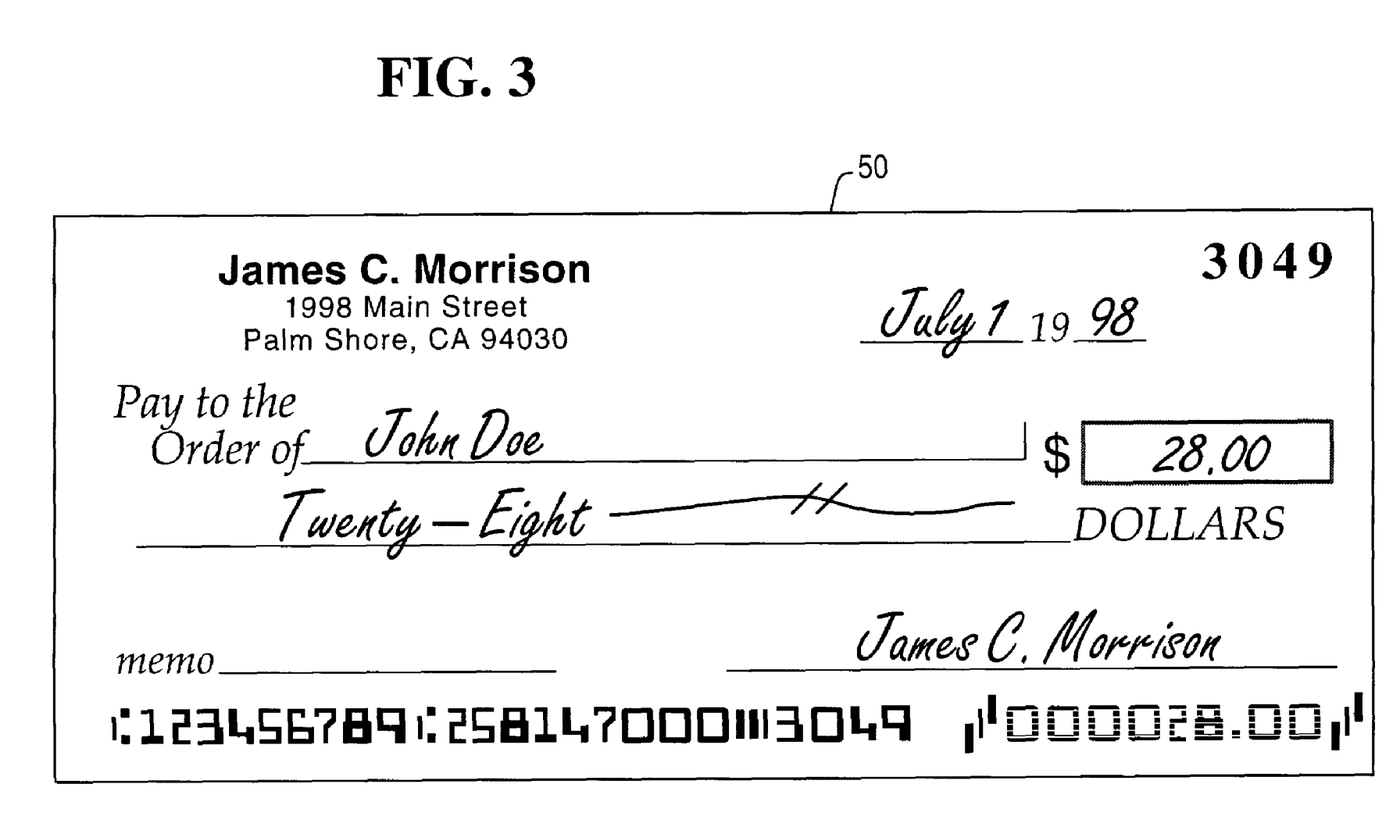
FIG. 3 is a view of a check image which has been captured by an imaging camera of the image capture and endorsement module of FIG. 2.

As mentioned, the document items moving past the imaging camera 40 include checks. An image of a typical check is illustrated in FIG. 3 and is designated with reference numeral "50". Check image data which is representative of the image of the check 50 is stored in a check image data memory 44, as shown in FIG. 2.

Figure 4:
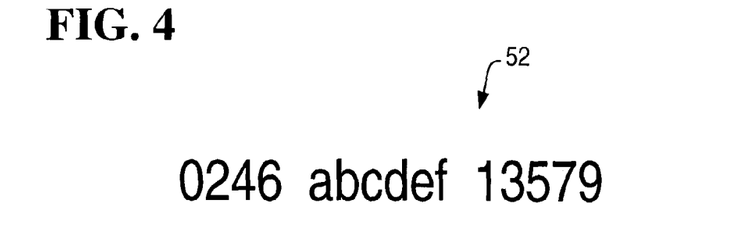
FIG. 4 is a view of an endorsement image represented by endorsement data.

The image capture and endorsement module 20 further includes an endorsement data generator application program 100 for generating supplemental data which is representative of an image of supplemental information to be appended to the check 50. The generated supplemental data may be in the form of endorsement data which is representative of an image of an endorsement to be appended to the check 50. An endorsement image is shown in FIG. 4 and is designated with reference numeral "52". For simplicity purpose of explanation, the endorsement image of FIG. 4 includes only a few alphanumeric characters.

The check processing system 10 further includes a codeline reader module 22 such as a MICR reader located along the document track 14. The MICR reader 22 reads a MICR codeline from each check being processed in a known manner. Alternatively, the codeline reader may be an OCR reader instead of a MICR reader depending upon the particular application. An encoder module 24 encodes missing fields on each check. The structure and operation of MICR readers, OCR readers, and encoders are well known and, therefore, will not be described.

The check processing system 10 further includes a transport processor 32 and a transport operator interface 33 which communicates via signals on line 34 with the transport processor. The operator interface 33 may include a keyboard, a mouse, and a display, all of which communicate via signals with the transport processor 32. The transport processor 32 controls operation of the transport 12 via signals on line 35. Suitable processors and memories are readily available in the marketplace. Their structure and operation are well known and, therefore, will not be described.

The check processing system 10 also includes a transport memory 36 which communicates via signals on line 37 with the transport processor 32. It is contemplated that the memory 36 could be a single memory unit or a plurality of different memory units. An executable transport application program is stored in the memory 36. The transport application program is associated with a particular type of document processing work. For example, one type of work is proof of deposit. Another type of work is remittance processing. Still another type of work may be sorting of document items. When the transport application program is executed, the hardware devices contained within the check processing modules lying along the document track 14 are controlled to process document items moving downstream along the document track in accordance with the transport application program, as is known. The transport memory 36 also stores sequence numbers, MICR codelines, image data, encoder status, and endorsement status associated with document items which have been processed in accordance with the transport application program.

Figure 5:
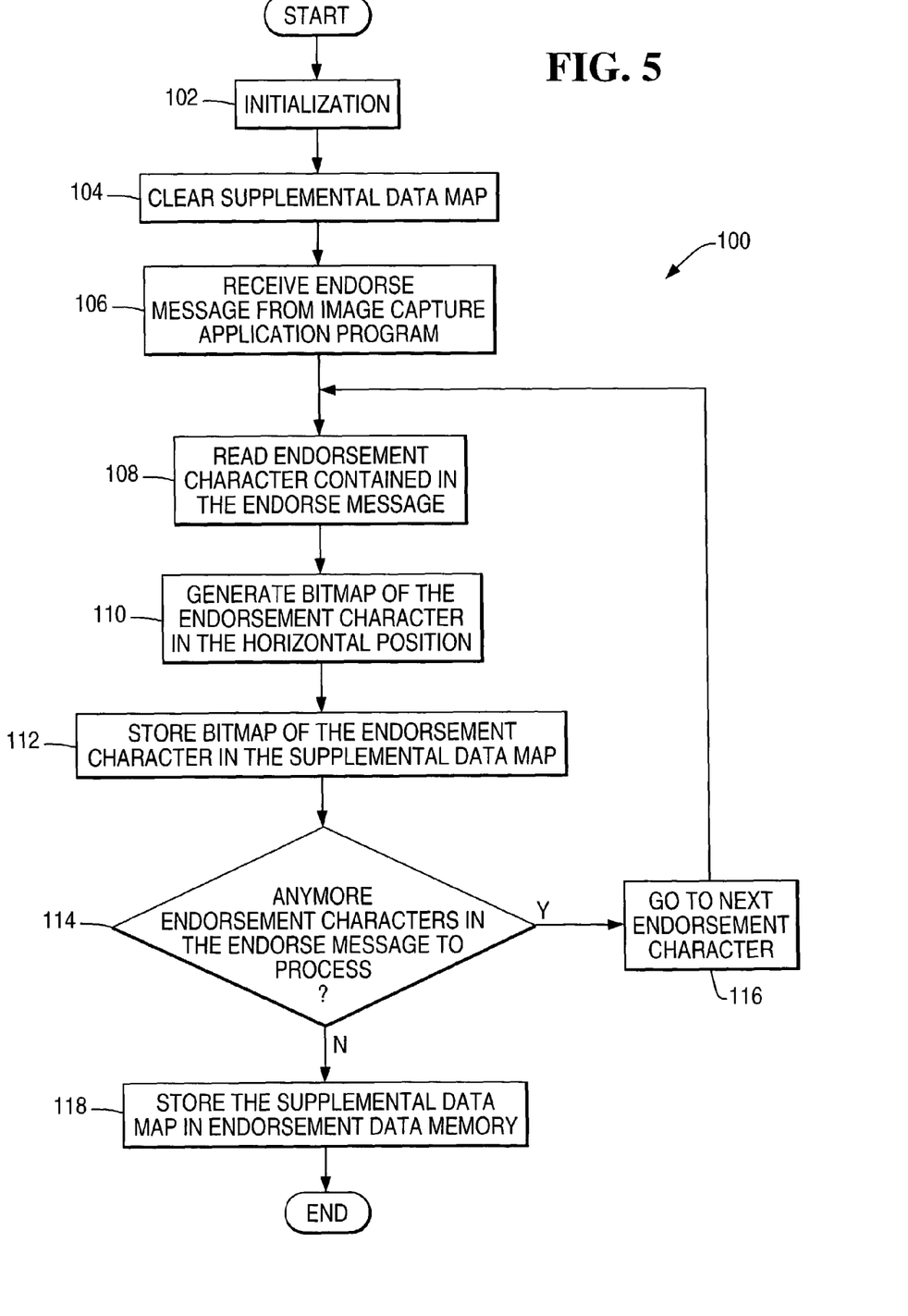
FIG. 5 is a flow diagram depicting operation of an endorsement data generator application program for generating endorsement data which is representative of the endorsement image of FIG. 4.

Referring to FIG. 5, a flow diagram depicts operation of an endorsement data generator application program 100 for generating endorsement data which is representative of the endorsement image of FIG. 4. After program initialization in step 102, the program proceeds to step 104 in which a supplemental data map is cleared. The program receives an endorse message from the image capture application program 42. The endorse message contains endorsement details for endorsing the associated check being processed.

The program proceeds to step 108 in which an endorsement character from the endorse message is read. Then, in step 110, a bitmap of the endorsement character read in step 108 is generated. In this example, a bitmap of the endorsement character in the horizontal position is generated. The generated bitmap of the endorsement character is stored in the supplemental data map, as shown in step 112.

A determination is then made in step 114 as to whether there are more endorsement characters in the endorse message to be processed. If the determination in step 114 is affirmative, the program proceeds to step 116 to obtain the next endorsement character from the endorse message before returning to step 108 to read this endorsement character and process it in same manner as described hereinabove for the previous endorsement character. The program continues in this loop until all endorsement characters in the endorse message have been processed and stored as bitmaps in the supplemental data map. When the last endorsement characters in the endorse message has been processed, the determination in step 114 is negative and the program proceeds to step 118 in which the supplemental data map of all of the endorsement characters from the endorse message is stored in an endorsement data memory 46 as shown in FIG. 2.

Figure 6:
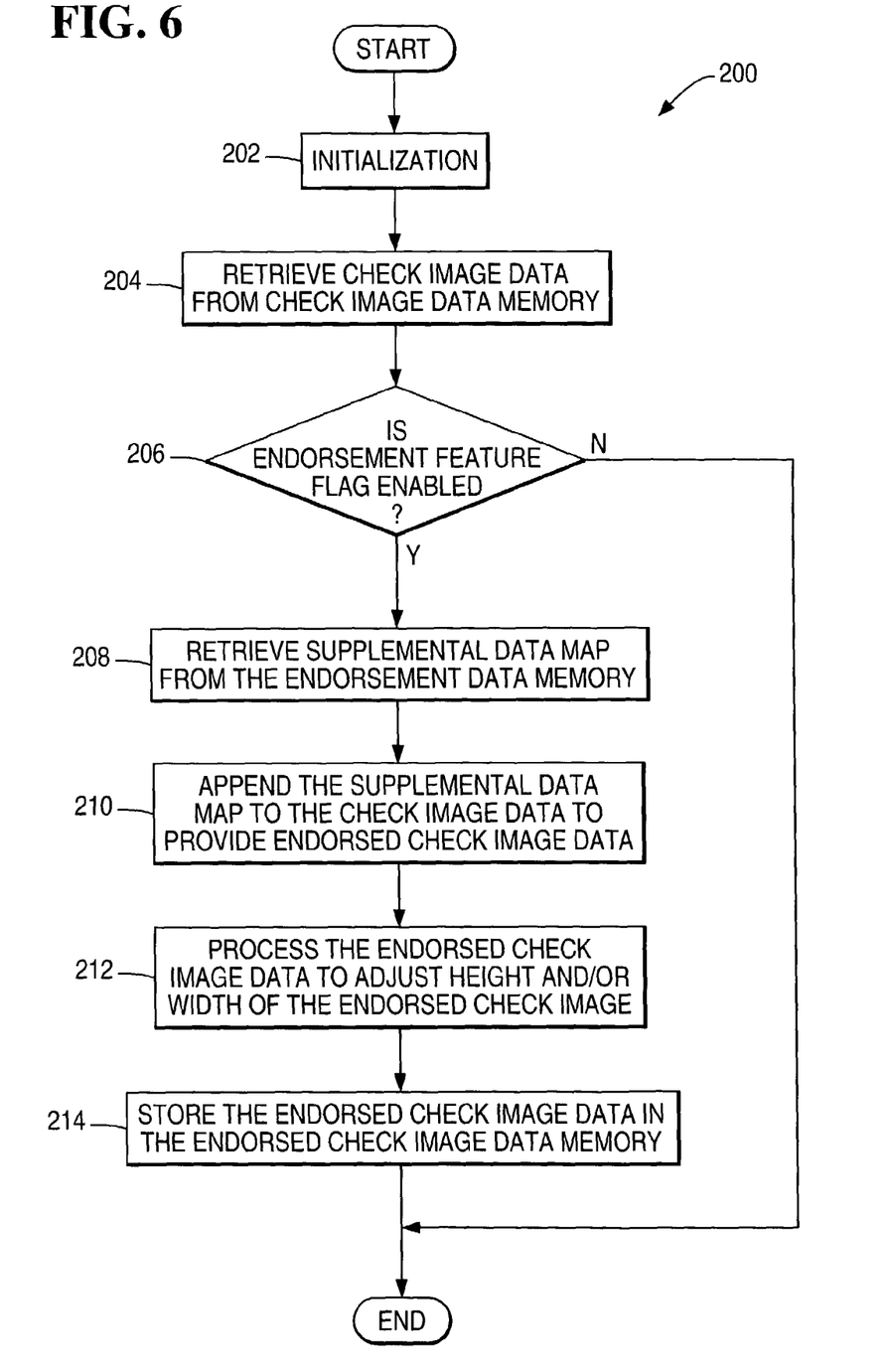
FIG. 6 is a flow diagram depicting operation an endorsement manager application program for appending endorsement data which is representative of the endorsement image of FIG. 4 to check image data which is representative of the check image of FIG. 3.

Referring to FIG. 6, a flow diagram depicts operation of an endorsement manager application program 200 for appending endorsement data which is representative of the endorsement image of FIG. 4 to check image data which is representative of the check image of FIG. 3. After program initialization in step 202, the program proceeds to step 204 in which check image data which is representative of the check image of FIG. 3 is retrieved from the check image data memory 44 (FIG. 2). A determination is made in step 206 as to whether the endorsement feature flag is enabled. This flag may be provided by the image capture application program 42, for example. If the determination in step 206 is negative, the program terminates. Otherwise, the program proceeds to step 208.

Figure 7:
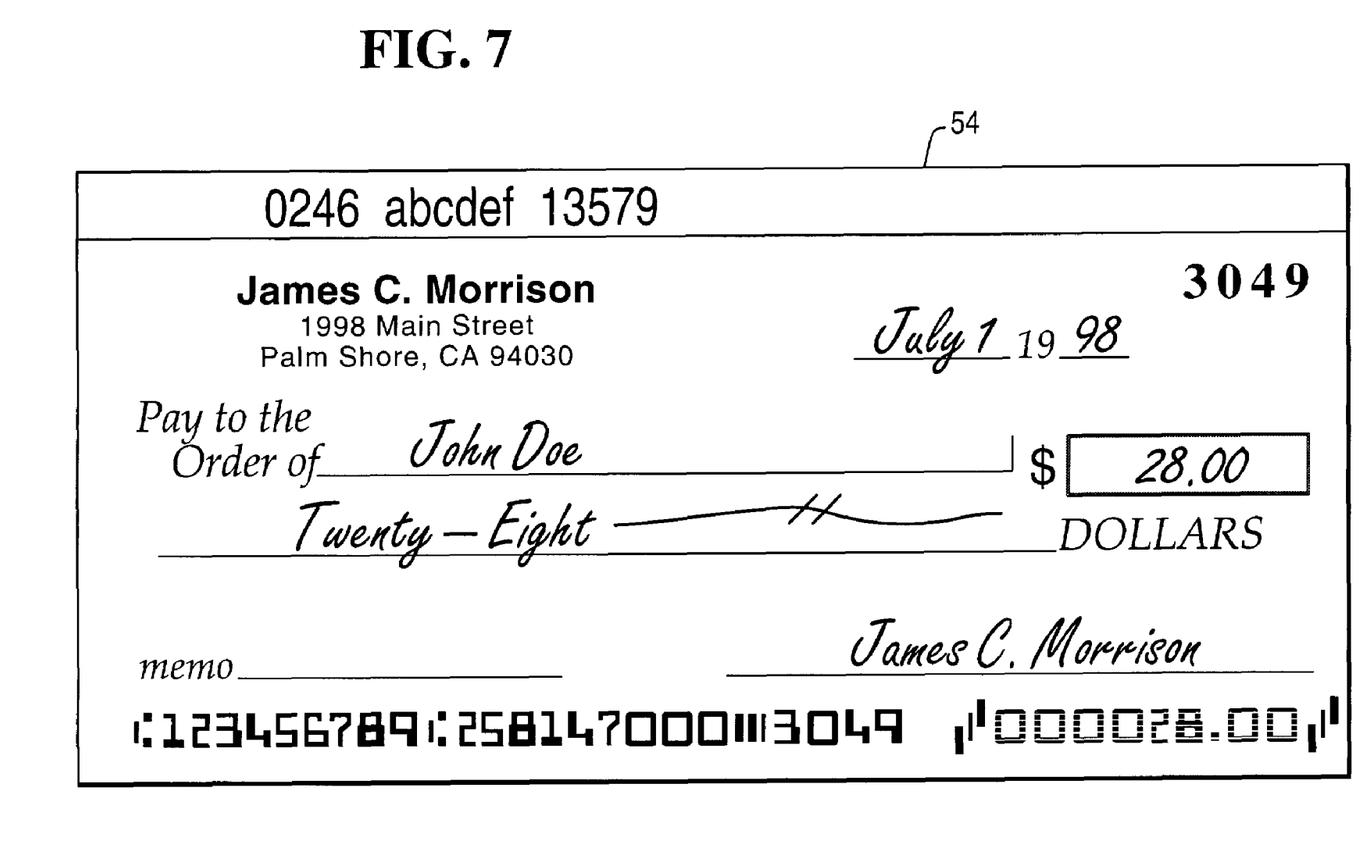
FIG. 7 is a view of an endorsed check image which is represented by check image data which is representative of the check image of FIG. 3 and endorsement data which is representative of the endorsement image of FIG. 4.

In step 208, the supplemental data map which is representative of an endorsement image of FIG. 4 is retrieved from the endorsement data memory 46 (FIG. 2). In step 210, the supplemental data map which is representative of the endorsement image of FIG. 4 is appended to the check image data which is representative of the check image of FIG. 3 to provide endorsed check image data which is representative of an endorsed check image such as shown in FIG. 7. Then, as shown in step 212, this endorsed check image data may be processed as desired to adjust the height and/or width of the endorsed check image. The endorsed check image data which is representative of the endorsed check image shown in FIG. 7 is stored in endorsed check image data memory 48 (FIG. 2) as shown in step 214.

It should be apparent that the image application program 42, the endorsement data generator application program 100, and the endorsement manager application program 200 cooperate together to provide an image of an endorsed check. The image capture application program 42 provides check image data which is representative of a check image and which is stored in the check image data memory 44. The endorsement data generator application program 100 provides endorsement data which is representative of an endorsement image and which is stored in the endorsement data memory 46. The endorsement manager application program 200 processes the check image data from the check image data memory 44 and the endorsement data from the endorsement data memory 46 to provide endorsed check image data which is representative of an endorsed check image and which is stored in the endorsed check image data memory 48. The endorsed check image is a composite image in which the endorsement image is appended to the check image.

Although the above description describes appending supplemental data, such as endorsement data, to the check image data such that the endorsement image appears along the top edge of the check image such as shown in FIG. 7, it is contemplated that the endorsement data could be appended to the check image data such that the endorsement image appears along the bottom edge, the leading edge, and/or the trailing edge of the check image. Also, if the endorsement image appears along the leading edge and/or trailing edge of the check image, it is contemplated that the bitmaps of the endorsement characters generated in step 110 of the flow diagram of FIG. 5 may need to be generated in the vertical position instead of the horizontal position so that the endorsement image can be read sideways (i.e., rotated 90 degrees from the horizontal position). Also, although the above description describes the check image data memory 44 and the endorsed check image data memory 48 as being different and separate from each other, it is contemplated that the these two memories comprise a single memory.

A number of advantages result by processing documents such as bank checks in accordance with the present invention as just described hereinabove. One advantage is that an endorser module having a printer is not needed. Although an endorser module having a printer is not needed, it is conceivable that there may be some check processing applications in which a printed endorsement is also either desired or required. Another advantage is that the endorsement on the check 50 is easily readable in a clear visible band and not possibly overprinted on original text of the check. Still another advantage is that the need for capturing an image of an endorsed check is eliminated.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A computer-implemented method of processing which is other than displaying check image data in an image-based check processing system, the computer-implemented method comprising the steps of:
   (a) at a first time, electronically by an imaging camera capturing check image data which is representative of a captured bitmap image of the check;
   (b) electronically by a processor receiving a message which contains a number of endorsement characters;
   (c) at a second time which is different from the first time, electronically by a processor processing the endorsement characters contained in the message to provide endorsement data which is representative of a generated bitmap image of the endorsement characters, the generated bitmap image of the endorsement characters being other than a captured bitmap image of the endorsement characters;
   (d) at a third time which is after the first and second times, electronically by a processor appending the generated bitmap image of the endorsement characters to the captured bitmap image of the check to provide a non-captured composite bitmap image of the check and the endorsement characters, the non-captured composite bitmap image of the check and the endorsement characters being other than a captured composite bitmap image of the check and the endorsement characters; and
   (e) storing in a memory the non-captured composite bitmap image of the check and the endorsement characters so that the non-captured composite bitmap image can be later retrieved for subsequent displaying of the non-captured composite bitmap image of the check and the endorsement characters.

2. A computer-implemented method according to claim 1, wherein step (e) includes the step of:
   (e-1) electronically by a processor appending the generated bitmap image of the endorsement characters to the captured bitmap image of the check such that the endorsement characters appear along the top edge of the non-captured composite bitmap image when the non-captured composite bitmap image is later retrieved for subsequent displaying of the non-captured composite bitmap image of the check and the endorsement characters.

3. A computer-implemented method according to claim 1, wherein step (e) includes the step of:
   (e-1) electronically by a processor appending the generated bitmap image of the endorsement characters to the captured bitmap image of the check such that the endorsement characters appear along the leading edge of the non-captured composite bitmap image when the non-captured composite bitmap image is later retrieved for subsequent displaying of the non-captured composite bitmap image of the check and the endorsement characters.

4. A computer-readable medium, the medium tangibly embodying one or more programs of instructions executable by the computer to perform method steps for processing which is other than displaying check image data in an image-based check processing system, the method comprising the steps of:
   (a) at a first time, capturing check image data which is representative of a captured bitmap image of the check;
   (b) receiving a message which contains a number of endorsement characters;
   (c) at a second time which is different from the first time, processing the endorsement characters contained in the message to provide endorsement data which is representative of a generated bitmap image of the endorsement characters, the generated bitmap image of the endorsement characters being other than a captured bitmap image of the endorsement characters;
   (d) at a third time which is after the first and second times, appending the generated bitmap image of the endorsement characters to the captured bitmap image of the check to provide a non-captured composite bitmap image of the check and the endorsement characters, the non-captured composite bitmap image of the check and the endorsement characters being other than a captured composite bitmap image of the check and the endorsement characters; and
   (e) storing the non-captured composite bitmap image of the check and the endorsement characters so that the non-captured composite bitmap image can be later retrieved for subsequent displaying of the non-captured composite bitmap image of the check and the endorsement characters.

5. A computer-implemented method of processing which is other than displaying check image data in an image-based check processing system, the computer-implemented method comprising:
   at a first time, electronically by an imaging camera capturing check image data which is representative of a captured bitmap image of the check;
   at a second time which is different from the first time, electronically by a processor processing endorsement characters to generate endorsement data which is representative of a generated bitmap image of the endorsement characters; and
   at a third time which is after the first and second times, electronically by a processor processing the captured check image data and the generated endorsement data to provide non-captured composite bitmap image data which is representative of a non-captured composite bitmap image of the check and the endorsement characters.

6. A computer-implemented method according to claim 5, wherein the endorsement characters appear along the top edge of the non-captured composite bitmap image of the check and the endorsement characters.

* * * * *